L. G. D'ARLINCOURT.
AUTOMATIC TELEGRAPHIC APPARATUS.

No. 114,771. Patented May 16, 1871.

FIG. 1

L. G. D'ARLINCOURT.
AUTOMATIC TELEGRAPHIC APPARATUS.

No. 114,771. Patented May 16, 1871.

L. G. D'ARLINCOURT.
AUTOMATIC TELEGRAPHIC APPARATUS.

No. 114,771. Patented May 16, 1871.

Witnesses: Inventor:

L. G. D'ARLINCOURT.
AUTOMATIC TELEGRAPHIC APPARATUS.

No. 114,771.          Patented May 16, 1871.

L. G. D'ARLINCOURT.
AUTOMATIC TELEGRAPHIC APPARATUS.

No. 114,771.  Patented May 16, 1871.

L. G. D'ARLINCOURT.
AUTOMATIC TELEGRAPHIC APPARATUS.

No. 114,771. Patented May 16, 1871.

United States Patent Office.

LUDOVIC CHARLES ADRIEN JOSEPH GUYOT D'ARLINCOURT, OF PARIS, FRANCE.

Letters Patent No. 114,771, dated May 16, 1871.

IMPROVEMENT IN ELECTRIC TELEGRAPHS.

The Schedule referred to in these Letters Patent and making part of the same.

*To all whom it may concern:*

Be it known that I, LUDOVIC CHARLES ADRIEN JOSEPH GUYOT D'ARLINCOURT, of Paris, in the French Empire, gentleman, have invented Improvements in Telegraphic Apparatus; and I do hereby declare that the following is a full, clear, and exact description of the same, reference being had to the annexed drawing making a part of the same.

My invention relates to improvements in telegraphic apparatus; and

It consists—

First, in improved mechanical and electrical means of insuring the synchronous action of the receiver and manipulator.

Secondly, in the application of induction apparatus generally to telegraphic apparatus, with the object hereinafter stated.

Thirdly, in telegraphic autographic apparatus, the complete reversing of the decomposing current in order to reproduce, at the receiver, the types of the message perfectly distinct and spotless.

The several mechanical means I employ for obtaining a synchronous action, are—

First, the circular vibration of a diapason, or

Secondly, the vibration of a cord; and

Thirdly, two systems of clock-work, either combined or independent, and arranged in the manner hereinafter described.

The electrical means I employ for obtaining a synchronous action of the two apparatus consist—

First, in causing one of the apparatus to work faster than the other, and arresting it at every turn, when it is again started by a current from the other apparatus, which is kept in constant motion. In this manner the two apparatus will start exactly together and so correspond with each other.

Secondly, in stopping the two apparatus one after the other, and one by the other, when it is desired to have the same speed in both apparatus.

The distinctive features of my invention above referred to are applicable to all kinds of telegraphic apparatus, whether writing, printing, or autographic.

My invention will be readily understood on referring to the accompanying drawing, the system being shown, as an example only, applied to an autographic telegraph apparatus, in which a chemical decomposition is produced.

All other figures are modifications and details intended to render either the function of the mechanical pieces or that of the electric currents better understood.

It is well known that autographic apparatus are ordinarily provided with two cylinders, on one of which, viz., that of the manipulator, is placed a strip of tin bearing the message inscribed thereon in insulating ink, while the other cylinder, that of the receiver, bears the chemically-prepared paper.

Each of the apparatus is provided with a pointer placed in contact with the cylinder while in motion.

The pointer is mounted on a screw, whereby it is caused to travel gradually over the whole surface of said cylinder, and when the pointer is brought in contact with the insulating ink of the transmitting manipulator a point or dot will be produced on the paper of the receiver, the whole series of points exactly reproducing the message to be dispatched.

Instead of the message being reproduced on a roller or cylinder it may be on a flat strip, of indefinite length, the principles or features of my invention being the same in both cases.

Figure 1:
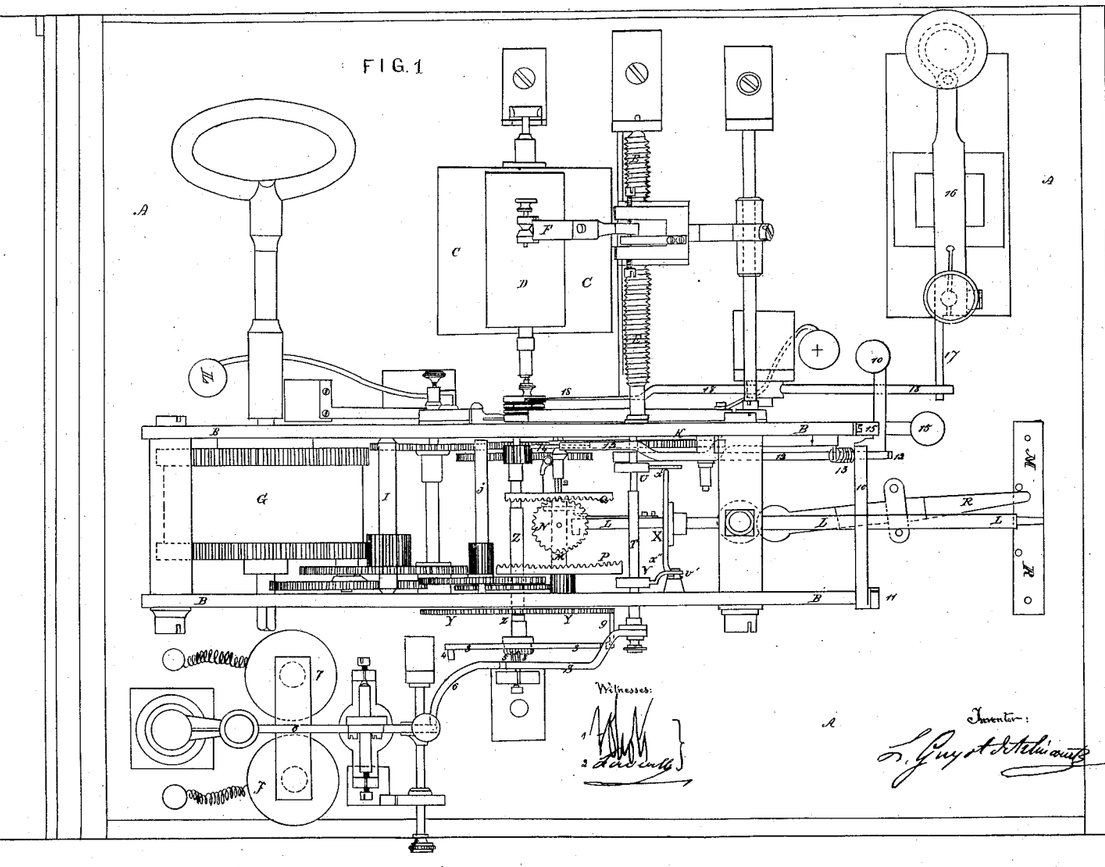
Figure 1 is a plan of the apparatus arranged according to my improvements.
Figure 2:
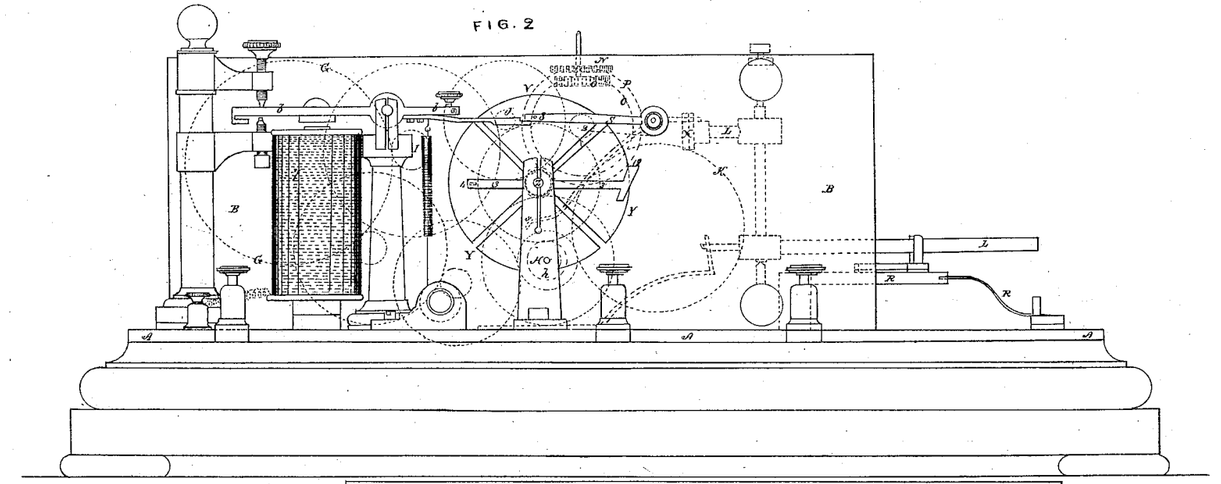
Figure 2 is a back view.
Figure 3:
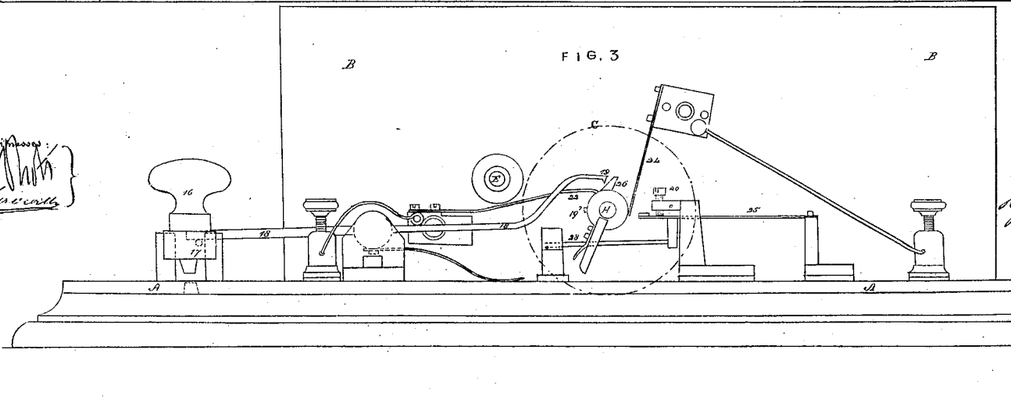
Figure 3 a front view of the same.

In the autographic apparatus shown in figs. 1, 2, and 3, I make use of rollers, and I regulate the synchronism at each revolution, by causing the roller of the manipulator to turn faster than that of the receiver.

The manipulator-roller is caused to stop at each revolution; the roller of the receiver is constantly in motion, and transmits a current to the manipulating apparatus for the purpose.

I obtain this result by the aid of disconnecting gear, hereinafter described, which permits of changing the relative speed of the rollers, and thus transforming the manipulating apparatus into a receiver, and *vice versa*.

In case it is desired to maintain the same speed in both apparatus, the synchronism is obtained by arresting the motion of the two apparatus alternately, one by the other, as before mentioned, and as will be hereinafter described.

I will first describe the principal parts shown in figs. 1, 2, and 3, and then the mechanical and electrical functions of the apparatus.

The synchronism is obtained by a wheel-work independent from that of the apparatus proper, hence two distinct sets.

The red lines in the drawing indicate the wheel-work for obtaining synchronous action, while the blue lines show the gearing serving to produce the motion of the roller and of the pointer, and also for stopping either by mechanical or electrical means.

The wheel-work serving to insure a synchronous action may be like that of a chronometer, and regulated by the circular vibration of a diapason or the vibration of a cord, as will be more fully explained, and is kept in constant motion, while the wheel-work of the apparatus properly so called has intermittent motion.

These two sets of wheels may either be combined or separated, and are driven by the same barrel, as shown in figs. 1, 2, and 3.

The synchronism is obtained by throwing the two sets of wheels in or out of gear with each other, and also by the means employed for arresting the motion of the two apparatus, and then again starting them together at the desired moment.

A, base of the apparatus.

B B, plates between which the gearing is inclosed.

C, roller, the part D of which is of gutta-percha, or other non-conducting material, for receiving the tin-foil or electro-chemical paper to be applied on said roller.

E, screw for moving pointer F.

G, double-acting spring barrel for transmitting motion to roller-spindle H, fig. 2, by means of wheels I J Z.

Motion is transmitted to screw E by a toothed wheel, K, which receives motion from a pinion keyed on the roller-axis.

L, hand-lever for changing the apparatus from a manipulator to a receiver, and *vice versa*, by means of clutch M, and two wheels, N O, having different numbers of teeth, wheel N gearing with wheel P, and O with wheel Q, according as more or less speed is required.

R, commutator operated by the hand-lever L, and placed either on the manipulator or receiver, according to whether wheel N or O is to be put in gear.

S, lever fixed to spindle T, and carrying two small projections, U V, which serve to raise the lever S, as hereinafter described, by means of parts X fixed on lever L.

Y, ratchet-wheel mounted loose on spindle Z, said wheel being keyed on a pinion, 1, fig. 2, turning freely on said spindle Z.

This pinion forms part of the wheel-gearing indicated in red color, the movable parts being I, J, Z, and Q, on the latter of which is mounted the clutch M.

3, arm mounted on fixed axis Z, and serving to stop the apparatus either mechanically by means of a pin, 4, abutting against a pin, 8, of lever S, or electrically by means of a pin, 4, abutting against stop 5 carried on the armature $b$ of electro-magnet 7.

When a current is transmitted from the other apparatus for stopping the motion, as hereinafter described, the arm 3 will be arrested at every revolution by its pin 4 coming in contact with pin 8 of lever S, when the apparatus is used as a manipulator, the lever S being in this case held in the lowest position.

When armature 6 of the electro-magnet is attracted by a current from the receiver it raises lever S and frees pin 4 of lever 3, which then again moves with the wheel-work.

The lever S only stops the apparatus once for every revolution of the roller-spindle H; and as it is mounted on the next spindle Z, which moves five times as fast, it will abut against pin 4 once for every five revolutions of spindle Z.

For this purpose I place a small cam, $h$, on the roller-spindle H, which allows the arms to fall, and with them the lever S, to which they are fixed, at every revolution; during the four other turns of spindle Z the part $s$ will be kept raised by cam $h$.

On stopping the motion of spindle Z the ratchet-wheel Y continues to be rotated by the gearing represented in red color, in order to maintain the synchronism, and slips over the pawl 9 of arm 3.

On releasing the pin 4 of the electro-magnet 7 the arm 3 and spindle Z turn with the ratchet Y, the pawl 9 still keeping engaged in the teeth of the same.

I have before, in describing the parts S, mentioned two small projections, U V, fixed on spindle T and serving to raise or lower part S. Thus, as lever S is caused to stop the motion of the apparatus at every turn when used as a manipulator, it requires to be raised so as not to impede the continuous motion of the apparatus when used as a receiver.

In this case the end $x^1$ of the part before described as operated by the hand-lever L depresses projection U, bringing the projection V, carried on the same spindle, under a spring hook, $v'$, for keeping the part S raised.

When the apparatus is again converted into a manipulator by the hand-lever L the end $x^2$ of part X acts on the spring of hook $v'$, and so releases the projection V, thus allowing lever S again to fall for the purpose of arresting the motion of the apparatus at each revolution, as before explained.

10 is a lever, jointed at 11, and provided with a recess, which lever, when depressed, serves to fix the hand-lever L in position and prevent the apparatus changing from a manipulator to a receiver before its motion is entirely arrested.

For this purpose part 10 bears on one end of a lever, 12, whose other end acts, by the aid of a spring, 13, on a brake-wheel, 14, keyed on the spindle 2, carrying clutch M.

The lever 10 is held down by a flat spring, 15, provided with a catch. Thus, in order to move the hand-lever L, it is first necessary to liberate lever 10 by pressing spring 15, which, on releasing lever 12, stops the apparatus by the aid of the brake-wheel 14.

It will be seen from the foregoing, and by examining the drawing, that the wheel-gears, shown in red and blue colors, are both contained between the same cheek-plates, and are operated by the same spring barrel G.

The barrel inclosing the spring has two toothed wheels, one, being fixed to the axis, serving to wind the spring, the other being attached. In this manner the two wheels are moved in opposite directions by the same spring, and produce the motion of the two sets of wheels, which connect with the common axis Z carrying the ratchet-wheel Y and arm 3, only as the two sets of wheels turn in opposite directions, in order that the spindle Z may be turned in the same direction, thereby one of the two sets has an extra wheel. Thus the spindle Z is, so to speak, in two parts, as the ratchet-wheel Y is keyed on the small toothed pinion 1, mounted loose on said spindle, while arm 3 is keyed on the spindle.

From this arrangement it results that the motion of arm 3 connected with one set of wheels is independent of the motion of wheel Y connected with the other set. Arm 3 turns with wheel Y by means of its spring catch 9 taking into one of the teeth of said wheel; but immediately pin 4 of arm 3 abuts against stop 8 of lever S the movement of the arm, and consequently of the wheels in connection therewith, is arrested; but wheel Y and its set of wheels continue to turn, the teeth of Y slipping over the spring pawl 9, as before mentioned.

The foregoing constitute the means I employ for operating either one set of wheels only or both together. I will afterward describe the electrical means I employ for liberating arm 3 at the desired time for again starting its wheel-work.

The Morse manipulator, shown in figs. 1, 2, and 3, serves for cutting off the correspondence. This is effected mechanically when the apparatus acts as a receiver before sending the current which is to start the manipulator. The manipulator thus remains arrested, and the correspondent will know that communication has been cut off.

By pressing the knob of the Morse manipulator its stem 17, fig. 3, oscillates lever 18, the end 19 of which forms a stop for the stud 19', and thereby stops the motion of the roller-spindle. This Morse manipulator also serves to stop the receiver, but in this case by electrical means. As the receiver is always in motion for this purpose, it is simply a fixed current, which acts on the electro-magnet of the receiver, and so stops the apparatus by the aid of pin 5 acting on pin 4 of arm 3.

Figures 4, 5, 7:
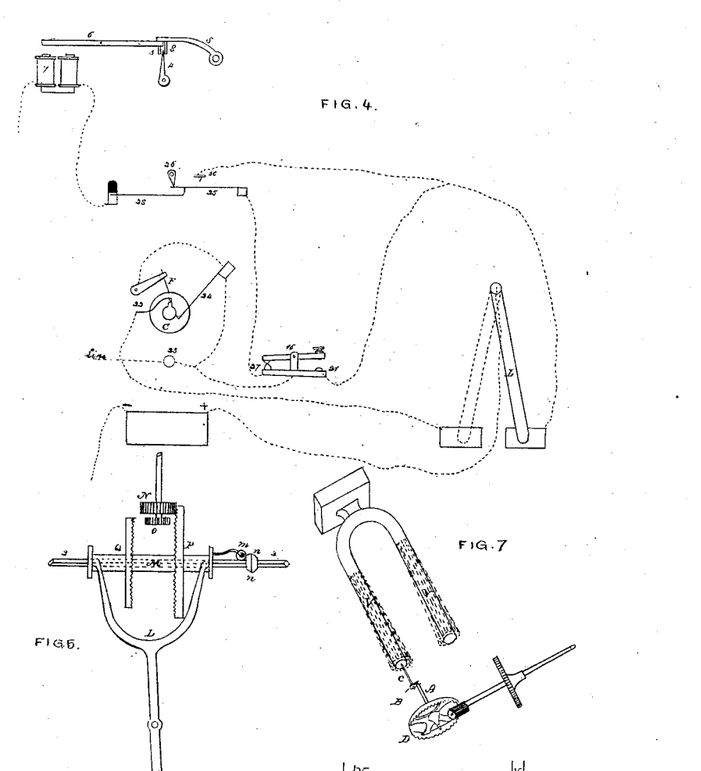

I will now proceed to describe the passage of the current in the apparatus for stopping the manipulator, which turns faster than the receiver. Fig. 3 shows a front view of the apparatus with the electrical connections, while fig. 4 shows the arrangement of the latter separately.

The positive pole of the battery is distributed as follows:

First, from hand-lever L to screw 20, when said hand-lever is placed in the position of manipulator and stud 21 of the Morse manipulator.

Secondly, to spring 22, when hand-lever L is on the receiver. The line from stud 23 always communicates with the center of the Morse manipulator 16, and also with spring 24 and pointer F.

The part carrying the spring 25, which falls at each revolution by the aid of cam 26, communicates with stud 27 of the Morse manipulator, and the end 28 of spring 25 communicates, when the latter is lowered, with one end of the electro-magnet 7, whose other end is in the earth. The negative pole of the battery and the roller are constantly connected with the earth.

I have before mentioned that the manipulating apparatus turns faster than the receiving apparatus, and is arrested at every revolution by a mechanical arrangement, and that it is further released electrically and again started by a current from the receiver. I will now describe the action of the current.

At each revolution of roller-spindle H cam or finger 26 depresses spring 25, by which communication is had with the line, by means of branch 28, with the stud communicating with one end of the electro-magnet 7, whereby the latter may receive a line current.

The apparatus at this moment will be arrested by the pin 4 of arm 3 abutting against pin 8 of lever S; the receiver then transmits a current to the electro-magnet 7, which attracts the armature 6 and so raises lever S; the finger 8 also rises and releases the pin 4. The spindle H then resumes its motion, as also cam 26, and liberates spring 25, which, in rising, comes in contact with the screw 20, communicating with the positive pole of the battery.

The positive pole is thus connected with the pointer and transmits the current required for decomposing the paper on the receiver-roller until the cam 26, after one revolution of the roller, again isolates the line of the positive pole by causing it to communicate with the electro-magnet, the apparatus at the same time stopping mechanically, as before explained.

The above arrangement serves for throwing out of gear the mechanical stop-motion of the manipulator. The same action takes place for the purpose of stopping the receiver when the manipulator is to cut it off—that is to say, the cam 26 of receiver depresses the springs 25 and 28, and places the coils in communication with the line; however, in this case the part S does not act as a stop to pin 4 by means of the pin 8, said part S being kept raised as a receiver, but instead of this the armature of the electro-magnet which receives a current from the manipulator serves to arrest the pin 4 by means of pin 5.

I have in Figure 4, for greater clearness, shown the spring 25, screw 20, and cam 26 as placed above the roller; but they would be disposed as described and represented in figs. 1, 2, and 3.

Having thus explained the current of the manipulator as regards the receiver, there is only the current from the battery to be transmitted, and this is effected once for every revolution of the roller, which, as before mentioned, has continuous motion.

This current is transmitted at the moment spring 22 is brought in contact with a small projection on an insulated wheel, fig. 4, mounted on the roller-spindle. This short interval, in which the battery of receiver acts, corresponds to that when the manipulator is stopped mechanically by the pin 4 abutting against 8. Thus the battery of receiver transmits a current which regularly starts the manipulator at each turn at the moment the spring 22 touches the projection.

I have above mentioned that the manipulator travels faster than the receiver, this being necessary as one apparatus is required to stop, and the two to travel together. It is also necessary that the speed of each apparatus should be reversed, as the same apparatus is to serve both as manipulator and receiver.

This object is attained by the aid of the gearing described with reference to figs. 1, 2, and 3, and which is further explained by reference to Figures 5 and 6.

P Q are two crown-wheels fixed on the coupling M, and gearing alternately with pinions N and O.

The coupling M is mounted on the squared shaft 2 of the apparatus, so as to slide freely thereon and also turn therewith.

L, hand-lever, by which the coupling M is traversed to the right or left so as to throw wheel P or Q into gear.

m, small pulley placed on the end of a spring plate attached to the coupling, and which, when placed on one side or the other of a stop, n, fixed on the shaft 2, prevents the coupling from moving.

The pinion O has a less number of teeth than N, and the two crown-wheels P Q have the same number of teeth.

When coupling M is moved from left to right by the aid of lever L, wheel P is thrown into gear with pinion N, the contrary being the case when the apparatus is to act as a receiver.

As the pinions N O and the spindles on which they are mounted turn in contrary directions, according to whether wheels P and Q are in gear therewith, in order to prevent the hand-lever L changing its position while the apparatus is in motion, which would create a shock, lever 10, before mentioned, is brought down so as to embrace it and to prevent it moving. This lever 10, when down, also determines the movement of the apparatus, as on being raised it allows the brake-lever 12, shown in the general plan of the apparatus, to act on wheel 14 for instantly stopping the apparatus, and allowing the wheels P and Q to be shifted by the aid of hand-lever L.

I have before explained the manner in which said lever establishes and changes the electrical communications by being placed on the stud either of the manipulator or receiver.

I apply the several modes of obtaining the synchronous action before mentioned to the axis carrying pinions N.

The vibrations of a diapason have before been used for regulating the motion of clock-work, but these vibrations being rectilinear—that is to say, to and fro in a straight line—in order to transform it into circular motion intermediate mechanical aids are required, such as escapement, which greatly complicate the whole and produce friction.

According to my invention I apply the circular vibration of a diapason for regulating the motion of telegraphic apparatus directly to rotary parts in a way also applicable to other purposes. I obtain the circular motion direct on the diapason without the aid of intermediate parts for converting the motion. In my apparatus the diapason is disposed in the manner shown in Figure 7.

Figures 6, 8, 9, 10:
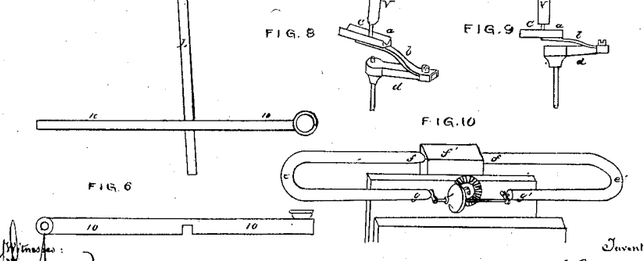

On the end of the spindle carrying the pinions N O before referred to, I place a crank at right angles, seen also in detail in Figures 8 and 9.

This crank is connected to a small grooved part, *a*, fixed on a spring, *b*, which latter has a constant tendency to press part *a* up to the end C of the diapason V.

The end of spring *b* is fixed on a crank, *d*, mounted on the axis of pinions N O. On the spindle being turned by means of the wheel-tram before described, it presses, by the aid of crank *d*, eccentrically on point C fixed against one limb of the diapason, producing a circular vibration, which is also imparted to the other limb; by this means I am enabled to obtain a continuous and regular motion of the apparatus. The small grooved part *a* serves to maintain the connection between the crank and diapason, whatever may be its extent of vibration.

Each manipulator and receiver is provided with a diapason of similar construction and strength for obtaining the mechanical synchronism of the wheel-work, which is further controlled or rectified by the electical synchronism.

In order to prevent any shaking of the support of the diapason I may also arrange it in the manner shown in Figure 10.

Instead of bending the rod forming the diapason at its center I bend it on both sides, as at *e e'*, the part *f* being fixed at *f* to the apparatus, the two bent ends *g g'* being brought in a line with the axis of the apparatus, and caused to vibrate thereby.

I may also regulate the synchronism by means of a cord having more or less tension, and fixed at each end. This cord may be either of metal or gut, or, instead of a cord, it may be a flat spring.

Figure 11:
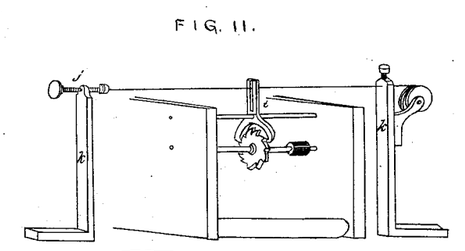

The vibrations would be transmitted to the apparatus either by means of the escapement shown in Figure 11, or by a crank, eccentric or otherwise, one or the other acting on the last or other wheel of the train, so as to obtain the desired synchronism in the action of the apparatus.

*k k*, supports, between which the cord is stretched.

*i*, escapement, through a slot in which the cord passes, so as to admit of its free vibration.

*j*, screw for regulating the tension of the cord or flat spring.

I will now describe the complete inversion of the decomposing or reacting current, whether such current is acting at the receiver chemically or electrically, according to the different kinds of telegraphic apparatus.

Hitherto in telegraphic apparatus the current in the electro-magnets had to be reversed by hand by mechanical means.

Part of my invention consists in making the complete inversion of the current both electrically and self-actingly. I can inverse by electrical means the current in the electro-magnet of any receiver, or of a relay, for example; and I intend to apply this improvement to telegraphic apparatus generally, and more especially to autographic apparatus. The electro-magnet in which I reverse the current may also serve any mechanical purpose in the apparatus desired.

In autographic apparatus there is but one single current at disposal, which is closed by the tin-foil and broken by the passage of the pointer over the insulating-ink. With this single current I propose to reverse the current of one line battery in order to prevent those slabs which are liable to take place at the receiver in consequence of the line being thus charged.

Hitherto it has been usual to discharge the line either by causing the current to deviate to the earth at the receiver or by a discharging-battery, the poles of which are placed inversely to those of the main battery, but these means have the disadvantage of diminishing the force of the current at the receiver.

According to my invention I obtain a complete discharge of the line, while at the same time preserving the full power of the battery, to be used for decomposing at the receiver by reversing the current from the main-line battery to the manipulator, in the following manner:

It is well known that in an induction-coil, when closing the inductive-current, an induced current is produced in one direction in the small covering wires, while, on opening this same inductive-current, an induced current is produced in the same wires in the inverse direction to the former. These apparatus thus possess of themselves a source of inversion which has never hitherto been utilized in telegraph apparatus generally for reversing again a battery-current on the line. I obtain this reversal by the aid of a reversing relay or any suitable system—for example, that described and illustrated in Figure 12, still as applied to an autographic apparatus.

Figures 12, 13, 23, 24:
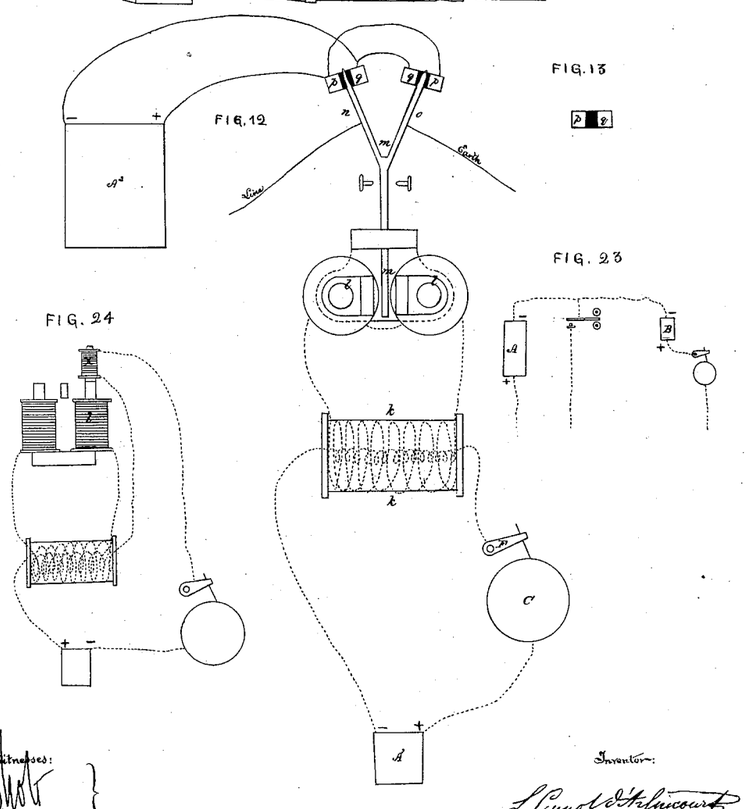

C, roller, on which the tin-foil is placed, and communicating with the positive pole of the local battery A'.

F, pointer, to which is connected the negative pole of the same battery after having passed through the inductive-wire of the induction-coil *k*. When the pointer comes in contact with the tin the circuit is closed, and when it touches the insulating-ink it is broken.

Every time the current is opened by the passage of the pointer over the ink a current is produced on the outside of the induction-coil *k*, which passes in one direction into the reversing electro-magnet *l*. Every time the induction-current is closed by the tin-foil a current is produced in the induced wire, and also in the electro-magnet *l* in a reverse direction to the first.

In this manner the pallet *m* will receive a to-and-fro motion, which I utilize for the purpose of reversing again the current of the main-line battery $A^2$, by any suitable means—for example, in the following manner:

The pallet is forked, the one part of spring *n* communicating with the line, and the other, O, with the earth.

Figures 18, 19, 20, 21, 22:
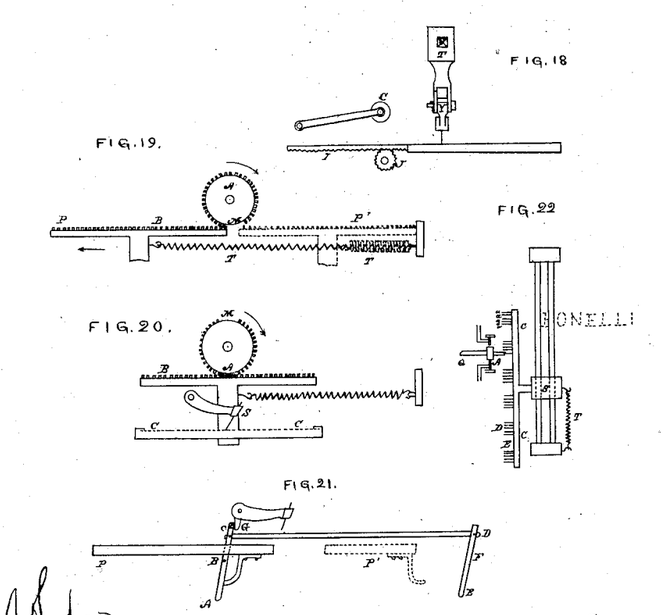

The two ends of these springs fit, respectively, in small coupling, each composed of two parts, isolated one from the other, as seen separately in Figure 18. One of these parts, *p*, for example, communicates with the positive pole of the main-line battery, and the other part, 9, with the negative pole of said battery.

It will be seen by examining the drawing that the to-and-fro motion of the pallet produces the reversal of the main-line battery-current by the aid of the springs *n* and *o*, which are applied alternately in reverse directions, first on the part communicating with the negative pole and then on that connected with the positive pole.

It is known that in telegraphic apparatus the chemical decomposition of the material covering the receiver-paper may be effected in two ways—

First, by means of electricity, which, coming through the pointer, decomposes it; this, in its turn reacts on the chemical composition so as to produce visible tracings.

Secondly, by a pointer inattackable by electricity—a platinum pointer, for instance, the function of which is only to bring in the current, which decomposes directly, and by mere contact of the pointer with the paper, the decomposition with which the latter is covered.

In the latter case of decomposition I obtain, through electric inversion of the decomposing current in the manner just described, so complete an effect as to give a writing or other tracing perfectly correct and free from any slabs.

As a proof thereof the writing is reproduced in the reverse or verso of paper of a light tint on a dark ground, while on the obverse or recto the writing is reproduced of a brown tint on light ground.

This result is obtained from this fact—that the positive current is carried now toward the roller or any piece on which the paper rests; in other words, is carried now beneath the paper or on the reverse of paper when the current is inverted, and now on the side of the pointer or obverse of paper when the current is direct; and on this side, then, it will mark a tracing darker than the ground resulting from decomposition.

I have described the peculiar application of the induction-coil, as it seems to me to be the best-suited apparatus to realize the speedy electric inversing of the decomposing-current, but I wish it to be understood that I do not limit myself to this peculiar means; but I claim as being of my invention the complete reversing of the decomposing-current obtained by any means, so as to afford at the receiver the character of a message dispatched perfectly correct, free from any slabs, a result never heretofore obtained.

Instead of employing an induction-coil for reversing the current into a relay, which then again reverses a battery-current on the line, I may also make use of this relay for supplying a battery-current to the line; and instead of placing the induction-coil near the transmitting apparatus I may place it and the relay at the end of the line—at Lyons, for example, when transmitting a positive-battery current from Paris.

This positive current would be received at Lyons in the induction-coil, and by making and breaking the circuit in Paris a reversal of the induction will be produced in the relay placed near the coil at Lyons.

This relay then transmits a fresh current from the line battery from Lyons to Marseilles, for example, thus constituting a transforming relay.

The transferring relays hitherto employed receive a current direct from Paris, for example, in the electro-magnet of the relay at Lyons, while on my system a current is received from Paris by an induction-coil at Lyons, which transmits another induction-current to the relay placed contiguous thereto for moving the pallet of the relay, whereby the current of the Lyons battery may be transmitted to Marseilles. This arrangement is represented in Figure 14 of the accompanying drawing.

The Paris line, also that of Marseilles, communicates with pallets of the electro-magnets of the reversing relays $l$ $l'$, that of Paris with the pallet $m$, and that of Marseilles with pallet $m'$.

The regulating-stud P, and, consequently, the Paris line, communicate with the induction-coil $k'$.

The stud P' and the Marseilles line communicate with the induction-coil $k$.

The other ends of the wires of the induction-coils communicate with the earth.

The two other regulating-studs Q Q' of pallets $m$ $m'$ communicate with the Lyons battery $A^1$.

A current sent from Paris will pass, by means of pallet $m$ and stud P, to the induction-coil $k'$, where it produces an induced current in the electro-magnet $l'$, causing pallet $m'$ to effect contact with stud Q'. The current from the Lyons battery $A^1$ will thus pass to Marseilles by the pallet $m'$ and the line wire.

When the Paris current ceases an induction-current in the reverse direction is produced in the induction-coil $k'$ and relay $l'$, which will return pallet $m'$ to its original position in contact with stud P'.

If, in the next place, the current be sent from Marseilles, it will pass by means of $m'$, P', and $k$, while the relay $l$, whose pallet $m$ is in contact with stud Q, will transmit to Paris the current from the Lyons battery $A^1$.

It will be understood that I reserve the right of using any suitable arrangement of induction-coil based on the induction of wires coiled one on the other; or it may be the induction of iron contained within the coil on the outer wires.

I propose, therefore, to claim the combination of an induction-coil and one electro-magnet, so as to form a new system of transferring relay, as described.

I have before mentioned that in order to regulate my improved apparatus at every turn I arrest the motion of the manipulator only, while the receiver is in constant motion, which serves thereby to transmit the current at each turn, which is to arrest the manipulator. It has been shown that in this system it is necessary for the manipulator, which has intermittent motion, to turn quicker than the receiver, which is in constant motion. Hence, I employ the disconnecting-gear described, consisting of two wheels, one having a greater number of teeth than the other.

I will next describe a means by which I stop both apparatus successively and so dispense with the gearing before referred to, both the apparatus traveling at the same speed.

Figure 15:
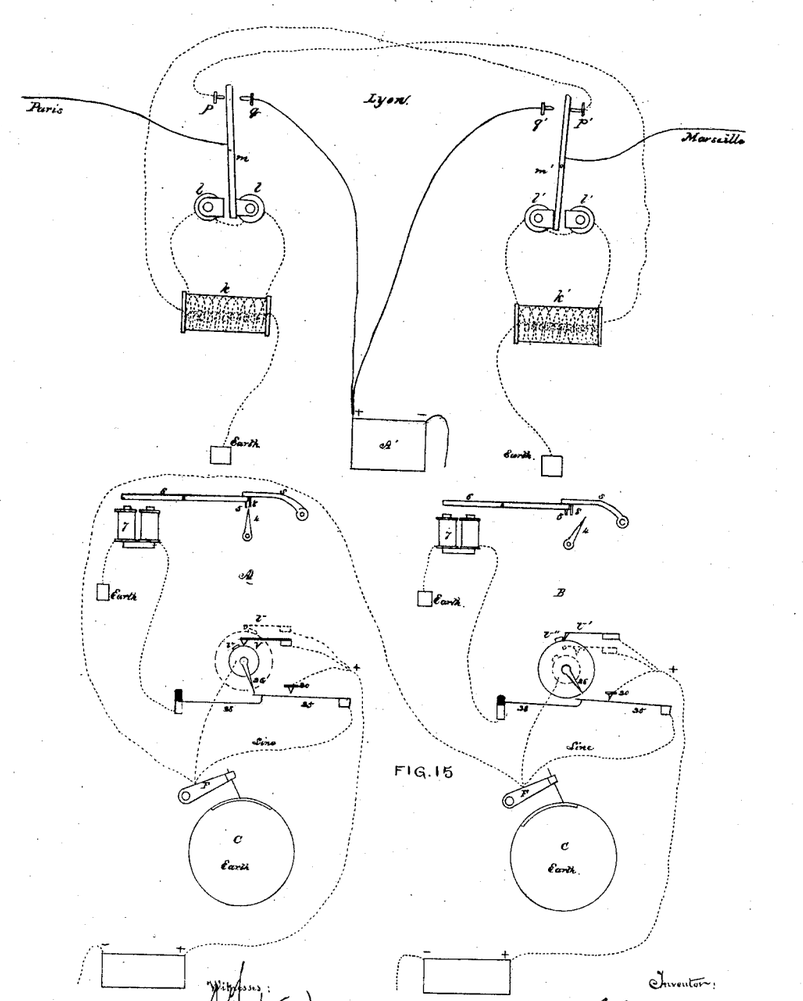

Figure 15 of the drawing shows the distribution of the currents.

In this case I will take a moment when the manipulator stops. The pin 4 will abut against pin 8, but cam 26, having depressed spring 25, the line will be in communication with electro-magnet 7, by means of the stud, said electro-magnet receiving a current for throwing the apparatus out of gear. This current is transmitted to the receiver by the spring U', (communicating with the positive pole of the receiving-battery,) and contact part U'', in communication with the line. The manipulator is in this manner disconnected by the receiver, which still acts until stopped by the pin 4 of receiver coming in contact with pin 8. The receiver is thrown out of gear and the manipulator starts again. This is effected by the spring U (communicating with the positive pole of the manipulator-battery) coming in contact with the part $u$, which connects with the line. The receiver is thus thrown out of gear, and the two rollers work in synchronism until the next turn, when the above action again takes place, and so on.

Fig. 15 is shown as arranged so that the apparatus A may act as manipulator and apparatus B as receiver; but in order to reverse their functions it is simply necessary to exchange the positive pole by a commutator in the two apparatus.

In this case the positive pole of apparatus A would connect with spring U instead of V, and in apparatus B the positive pole would communicate with spring V' instead of spring U', as shown by the dotted lines. It will be understood that I reserve the right of employing any suitable arrangement for disconnecting the stopping apparatus or the one which continues going.

Having thus described the distinctive features of my invention as applied to an autographic telegraph apparatus, I would observe that the same may be applied with equal advantage to telegraph apparatus generally, including printing and writing apparatus.

Further, in the case of an autographic apparatus, instead of reproducing the message on a roller I may, as before mentioned, employ a flat strip and still obtain the same synchronous action as before.

Figure 16:
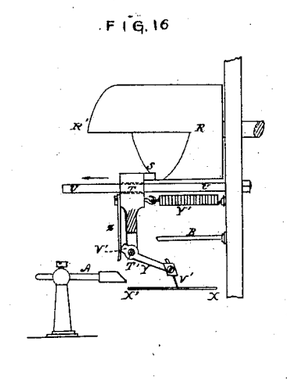
Figure 17:
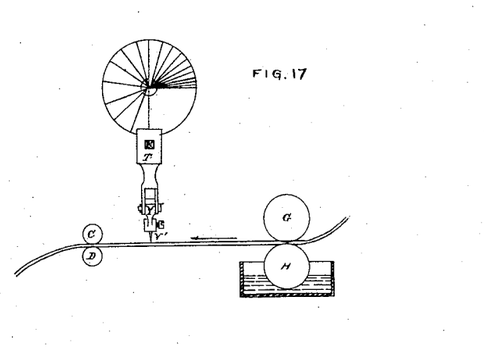

Figures 16 and 17 show each a disposition of parts in front and side views.

In this apparatus the rollers are replaced by a small cylinder of helical form, as shown. The pitch of the screw is so arranged that in its rotary motion it acts on a pin, S, fixed to part T so as to move the latter on a pin, U, in the direction of the arrow.

This part T has at its lower end a small lever, Y, on which is mounted a pointer, V' which traverses the whole width of the paper from point X to point X'. On reaching point X'—that is to say, when pin S coincides with point R' of the screw which is cut off at right angles—the pin S, and, consequently, part T, will immediately fall to R, fig. 16, aided by the spiral spring Y', which has a constant tendency to hold back the part T.

The pointer also returns to X, and if the screw recommences to turn it will recommence traveling gradually over the paper toward point X', afterward return to point X, as before.

This return movement coincides with the starting of both apparatus on equal terms by the electro-magnets, as before described.

In order to isolate the pointers, as in the roller apparatus before described, I arrange the parts as follows:

The pointer is mounted on a small lever, Y, oscillating at T'. When the pointer arrives at X' the fixed stop A raises lever Y and also the pointer, which is held raised during its return to point X by the action of a spring, Z, bearing on a small projection, V', of the arm y. The pointer is thus isolated from the paper which communicates with the earth.

On reaching point X the spring Z, supporting the points, abuts against the fixed stop B and releases the projection V', thus allowing the pointer to effect contact with the paper and move to point X'.

The paper is advanced under the pointer by means of the rollers C D, fig. 17, which are connected by wheel-gearing, and before passing under the pointer the paper passes between two other felted cylinders, G H, one of which is partly immersed in a bath serving to render the paper decomposable by the aid of electricity.

The foregoing relates to the receiver, and the same applies to the manipulator as regards the pointer; but in this case the endless paper is replaced by a plate, on which is fixed the metallic paper having the message inscribed. This arrangement is seen in fig. 18.

The plate carries a rack, I, gearing with a small wheel, J, fixed at one end of roller D, fig. 17.

Care should be taken to raise roller C, which is not used with the manipulator.

I will next describe another mode of writing on a flat surface; but instead of using a continuous strip a small sheet of prepared paper is used, which is to be placed in a sliding frame and another one substituted when the message is received.

Instead of imparting to-and-fro motion to the pointer, as before described, I make the paper to move in a longitudinal direction, as indicated in Figure 19.

The toothed wheel A gears with a rack, B, so as to move it in the direction of the arrow and put the spring T in tension, as shown.

The wheel A has a gap, M, in the teeth, and when the rack B is no longer held by the teeth it immediately returns by the action of the spring from the position P to P', while the wheel, continuing to turn, again gears with the rack and moves it from right to left until the wheel has completed one turn, when the rack will have reached position P.

The rack forms part of a horizontal frame on which the paper C is placed, as shown in Figure 20, thereby imparting to-and-fro motion thereto, as described.

The pointer is mounted on a micrometric screw, and is caused to traverse gradually the surface of the paper. The sudden stoppage of both apparatus at each turn is effected immediately on the return of the rack, and at the moment when the first tooth is brought in gear.

As before mentioned, when the motion of the apparatus is arrested the pointer requires to be out of contact. This I effect by means of the lever arrangement A C D E, Figure 21, which oscillates on points, B F.

At the moment the sliding frame reaches P it acts on point A of lever A B C, while point C of said lever presses on finger G for raising the pointer. When the sliding frame returns instantaneously to point P', it bears on the end of lever E F D, and by means of bars C and D the lever A B C is moved in the reverse direction, after which point G is free, and the pointer falls by its own gravity onto the paper and ceases to be isolated.

It will be understood that I reserve the right of reversing the above arrangement—that is to say, of fixing the paper and placing the pointer on the sliding frame, which would be made to travel in the manner above described with reference to the paper.

The means above described are also applicable for reproducing printing-type instead of writing, which also renders the apparatus much more rapid in its action. This I effect as follows:

Instead of making the pointer to travel over the surface of the paper by means of the screw, as described, which is very tedious, I simply make it travel over the surface of the line of type and then pass it to the next line. In this manner I save the time occupied by the pointer in traveling over the surface of the paper between any two lines; I divide each line, or, preferably, each letter, into five parts, for example, as effected by Bonelli, and thus obtain great rapidity of action.

In order to obtain this result I simply modify the action of the pointer, and replace the tin-foil contained in the sliding frame of the manipulator by a block containing printing-type, or by small strips of tin printed in advance by my printing apparatus, and fixed on the frame at suitable distance apart.

The modified action of the pointer consists simply in causing it to advance to a slight extent at each to-and-fro motion of the sliding frame corresponding to a fifth, sixth, or other part of a letter, instead of moving it gradually, as in the case of the screw before described.

For this purpose I use an escapement, A, Figure 22, which, every time it is displaced by the sliding frame, is caused to abut against the part Q and allow a small pin, a, on the bar C, to pass the pointer placed on part S, which moves forth therewith through the action of spring T of the pointer mounted on part S, which is then moved forward by the aid of the spring T.

It will be observed that the pins D are placed in groups of five, the groups designated by D corresponding to the surface of the printing-type letter, which is thus divided into five parts by the pointer.

The space E, between each group of pins, corresponds to the intervals between the lines. The pointer, it will be seen, thus passes immediately from one line to the next.

The reversing system by the induction-coil, as represented in fig. 12, has already been described.

I may use advantageously, instead of the complete inversion of the line current, the system of single current represented, Figure 23. From the inspection of this figure it may be seen that the relay is necessary to print a dark tint on a light ground, while the message can, without relay, be obtained with a light tint on dark ground. In fact, when this manipulating pointer closes the battery A in passing on the tin-paper, the battery B works and decomposes, while when the said pointer passes on the ink, the battery A, being open, insulates the battery B and the receiving pointer marks a light tint.

When the inductive-coil is employed, as already described, it occurs that the closing-current produces an inductive-current less strong than the inductive-current, resulting from the inductive-current being open.

To obviate this difficulty I use the arrangement as represented at Figure 24.

This arrangement consists in fitting on the end of the coil l of the relay corresponding to the least strong current a small additional coil, X, independent of the relay, which I interpose within the circuit of the inductive-current, so that the current remains in this independent coil and holds the pallet attracted on that side.

At the moment the inductive-current is broken the little additional coil acts somewhat like any other inductive-coil and serves merely to back the function of the relay.

Having thus described my invention,

I claim as new and desire to secure by Letters Patent—

1. The mode of producing the synchronism or synchronous action of the two apparatus, the manipulator and the receiver, by causing the latter to work faster than the former, and arresting the same mechanically at every turn, when it is again started electrically by a current from the other at the moment when the two apparatus are at the starting points, by the use of two independent sets of gears, substantially as described and represented at figs. 1, 2, 3, and 4.

2. The employment of the circular vibration of a diapason, or the rectilinear vibration of a cord to regulate the clock-work in general telegraphic apparatus, substantially as described and shown at figs. 7, 8, 9, 10, and 11.

3. The gearing systems set forth and represented, figs. 1, 2, and 5, to change the relative speed of the two apparatus, so as to transform the manipulator into receptor, and *vice versa*.

4. The combination or union of an inductive-coil or apparatus with an electro-magnet, so as to constitute a transferring relay, as described and shown, fig. 14.

5. The arrangement, substantially as described and represented at figs. 16, 17, 18, 19, 20, 21, 22, for application of my system to flat horizontal messages instead of on a circular rolled-up paper.

L. GUYOT D'ARLINCOURT.

Witnesses:
  F. OLCOTT,
  LARVUALLEY.